United States Patent [19]

Ensing

[11] 4,232,379
[45] Nov. 4, 1980

[54] AUTOMATIC BALANCING SYSTEM FOR SEISMIC EQUIPMENT

[75] Inventor: Lukas Ensing, Rijswijk, Netherlands

[73] Assignee: Shell Oil Company, Houston, Tex.

[21] Appl. No.: 963,052

[22] Filed: Nov. 22, 1978

[30] Foreign Application Priority Data

Dec. 29, 1977 [GB] United Kingdom ............... 54145/77

[51] Int. Cl.$^2$ .................................................. G01V 1/22
[52] U.S. Cl. ........................ 367/43; 367/43; 367/65; 367/76; 367/135; 328/165; 333/12; 73/1 DV
[58] Field of Search .................. 367/13, 22, 43, 45, 367/65, 76, 124, 135; 328/165, 149; 333/12; 73/1 DV; 179/15 BL; 340/177 VA, 177 CA

[56] References Cited

U.S. PATENT DOCUMENTS

| | | | |
|---|---|---|---|
| 2,164,196 | 6/1939 | Woodyard et al. ................ | 333/12 |
| 2,733,412 | 1/1956 | Alexander et al. ................ | 367/76 |
| 2,748,202 | 5/1956 | McCallister et al. .............. | 333/12 |
| 2,996,677 | 8/1961 | Marcy . | |
| 3,172,046 | 3/1965 | Paufve et al. . | |
| 3,289,089 | 11/1966 | Linder . | |
| 3,492,591 | 1/1970 | Shapiro . | |
| 3,504,194 | 3/1970 | Eastman et al. ................... | 328/151 |
| 3,564,287 | 2/1971 | Todd .................................... | 328/151 |
| 3,577,009 | 5/1971 | Hofmeister . | |
| 3,659,086 | 4/1972 | Metcalf ............................... | 328/151 |
| 3,757,235 | 9/1973 | McCormick et al. .............. | 328/165 |
| 3,795,877 | 3/1974 | Poole .................................. | 328/165 |
| 3,939,468 | 2/1976 | Mastin ................................ | 367/22 |
| 4,004,238 | 1/1977 | Wickmann ......................... | 328/165 |
| 4,054,910 | 10/1977 | Chou .................................. | 333/12 |
| 4,074,076 | 2/1978 | Zrudsky ............................. | 179/15 BL |
| 4,093,923 | 6/1978 | McCormick ....................... | 328/165 |

*Primary Examiner*—Howard A. Birmiel
*Attorney, Agent, or Firm*—J. Michael Ezzell

[57] ABSTRACT

A method and apparatus for reducing ground current interference with electrical signals representative of seismic signals, said electrical signals passing from at least one geophone to a recording system via an electric circuit including a balancing circuit coupled to ground, whereby a bridge circuit is formed which includes the geophone, the electric circuit and at least part of the recording system, and wherein the balancing circuit comprises two pairs of arms, each pair having at least one arm with variable impedance. Automatic adjustment of the variable impedance occurs based upon electrical information received by a detecting circuit for determining the variation in unbalance of the bridge circuit. Impedance adjustments may be made stepwise or continuously in alternative embodiments of the invention.

29 Claims, 10 Drawing Figures

AUTOMATIC BALANCING SYSTEM FOR SEISMIC EQUIPMENT

BACKGROUND OF THE INVENTION

The invention relates to a method and apparatus for reducing ground current interference with electrical signals representative of seismic wave signals passing from at least one geophone to a recording system via an electric circuit. The electric circuit includes relatively long electric cables lying on the surface of the earth.

Ground currents, or alternating currents travelling through the surface of the earth interfere with the electrical signals in these circuits. Those currents may be generated by various sources, such as domestic power lines, power supply of electric railways, and the operation of equipment designed for cathodically protecting buried metal structures (e.g., pipelines).

When carrying out seismic surveys in areas where ground currents occur, part of these currents will pass through the leads of the electric circuits that electrically connect a group of geophones with the recording system, and interfere with the electrical signals passing through these circuits, these electrical signals being representative of the seismic wave signals detected by the geophones. The currents enter the circuits through the resistive leakages and capacitive couplings of the circuits (such as the electric cables forming part of these circuits) and of the geophone coils to ground.

Several techniques have been attempted in the past to alleviate this interference of the ground currents with the seismic signals, which leads to unreliable seismograms recorded by the recorder of the recording system. In one of these techniques, a balancing circuit is used, which circuit comprises two pairs of arms that are electrically connected between the ground and the leads of the electric cable that leads from a group of geophones to a recording system. Each pair of arms comprises at least one variable impedance, and by adjusting the impedances the bridge circuit including the geophone(s), the electric cable, the balancing circuit and at least part of the recording system can be balanced such that the influence of the ground currents on the recorded signal is substantially suppressed.

It will be appreciated that the balancing circuit should be situated close to the input of the recording system, the latter system including suitable amplifying means, filter means, encoding station means and one or more recorders. After the balanced situation has been reached by adjusting the impedances of the balancing circuit, a seismic shot is fired, whereafter the seismic waves are detected by the geophones after their return to the earth surface, and passed on in the form of electrical signals through the electric circuit to the recording system.

Adjustment of the balancing circuit for balancing purposes requires the manual control of two knobs. By turning one of the knobs, the impedance of a first arm of the circuit (such as an arm consisting of a variable resistor) is varied such that the influence of the ground currents on the recorder is made minimal. Subsequently, the second knob is adjusted thereby varying the impedance of a second arm (which second arm belongs to a pair of arms not comprising the first arm) in order to further reduce this influence to a minimal value. The knobs are alternately adjusted in order to reduce the interference of the ground currents to as small a value as possible.

It will be appreciated that although adjustment of a balancing circuit is a simple operation, the adjustment required to reduce the interference of ground currents with seismic signals that are detected by a plurality of geophones divided up in twenty-four, forty-eight or even ninety-six groups is a time-consuming operation, since the twenty-four, forty-eight or ninety-six electric pairs of leads extending between the groups and the recording system are each provided with a separate balancing circuit. In fact, adjustment of all these balancing circuits prior to shooting is almost impossible since the leakage-to-ground pattern is not constant, as a result whereof the first-balanced balancing circuit will already require rebalancing before the last of the other balancing circuits has been balanced.

SUMMARY OF THE INVENTION

The present invention relates in particular to a method and apparatus for reducing ground current interference with electrical signals representative of seismic wave signals, where the electrical signals pass from at least one geophone to a recording system via an electric circuit including a balancing circuit coupled to the ground, whereby a bridge circuit is formed which includes the geophone, the electric circuit and at least part of the recording system, and wherein the balancing circuit comprises two pairs of arms, each pair having at least one arm with variable impedance.

An object of the invention is a method and apparatus for reducing ground current interference with seismic signals passing from at least one geophone through an electric circuit to a recording system, by means of a balancing circuit, wherein time-consuming adjustment of the balancing circuit is obviated. Application of this technique in a system for multichannel seismic operations will render such system balanced in all the channels thereof when the electrical signals representative of the seismic signals are passing therethrough.

The apparatus according to the invention comprises means for automatically adjusting the variable impedances of the pairs of arms of the balancing circuit, means adapted for detecting the variation in unbalance of the bridge circuit, and means for automatically re-adjusting the variable impedances of the arms when the unbalance has increased as a result of such adjusting.

The apparatus may comprise further means for interrupting the operation of the means for adjusting and re-adjusting the variable impedances prior to passing the electrical signals through the electric circuit.

Further, means may be provided for stepwise adjusting and re-adjusting the variable impedances in steps of pre-determined sizes, in combination with means for detecting the variation in the unbalance of the bridge circuit at least after each adjusting step.

In an alternative embodiment, the adjustment and re-adjustment means may be designed to adjust and re-adjust the variable impedance of an arm continuously, and the detection means may be designed to detect variations in the unbalance of the bridge circuit periodically.

The method according to the invention comprises the steps of automatically adjusting the variable impedances of the pairs of arms in a pre-determined sense, detecting variations in the unbalance of the bridge circuit, and automatically re-adjusting the variable impedances in an opposite sense if the unbalance has increased as a result of such adjusting.

BRIEF DESCRIPTION OF THE DRAWING

The invention will now be described by way of example in more detail with reference to the embodiments thereof shown in the drawing.

DETAILED DESCRIPTION OF THE PREFERRED EMBODIMENTS

Figure 1:
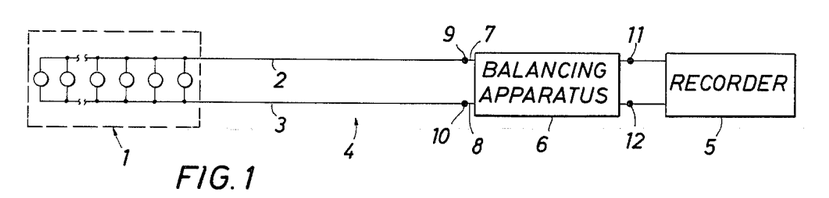
FIG. 1 schematically shows the lay-out of a seismic wave detection system comprising the automatic balancing apparatus according to the invention for reducing ground current interference with the seismic signals in a seismic channel.

The seismic wave detection system of FIG. 1 essentially consists of a group of geophones 1 that are electrically coupled with the leads 2 and 3 of the electric cable 4 leading to a recorder 5. An automatic balancing apparatus 6 is arranged between one end of the cable 4 and the recorder 5. Designs of this balancing apparatus will be described hereinafter in more detail with reference to FIGS. 2–4, FIGS. 5–7, and FIGS. 8–10 of the drawings.

The system shown in FIG. 1 represents a single seismic channel. Twenty-four or forty-eight of such channels are normally applied simultaneously in seismic operations. The geophones of all the groups as well as the electric connections between the geophone cables and the cables extending to a central point where the recording of the seismic signals takes place are situated on the earth surface, and under wet conditions considerable resistivity leakage may occur between the various parts of the seismic channels and the ground. As a result thereof and of the capacitance between the cables and the ground, ground currents may enter the seismic channels and interfere therein with the electric signals generated by the geophone groups, the electric signals being representative of the seismic wave signals. The disturbances resulting from the interference cannot be effectively filtered from the final signals that are recorded by the recorders and will undesirably influence the interpretation of the recorded signals.

The ground current interference can now be reduced according to the invention by providing an automatic balancing apparatus 6 in each of the seismic channels that are applied in the seismic operation. This automatic balancing apparatus 6 will suppress the influence of resistive leakage to ground as well as of the capacitive coupling between the cable and the ground. The apparatus 6 is coupled between the cable 4 and the recorder 5 of the seismic channel shown in FIG. 1, and comprises two electric leads 7 and 8 with input terminals 9, 10 adapted for electrically connecting the leads 7 and 8 to the cable 4, and output terminals 11, 12 for electrically connecting the leads 7, 8 to the input terminals of the recorder 5.

Figure 2:
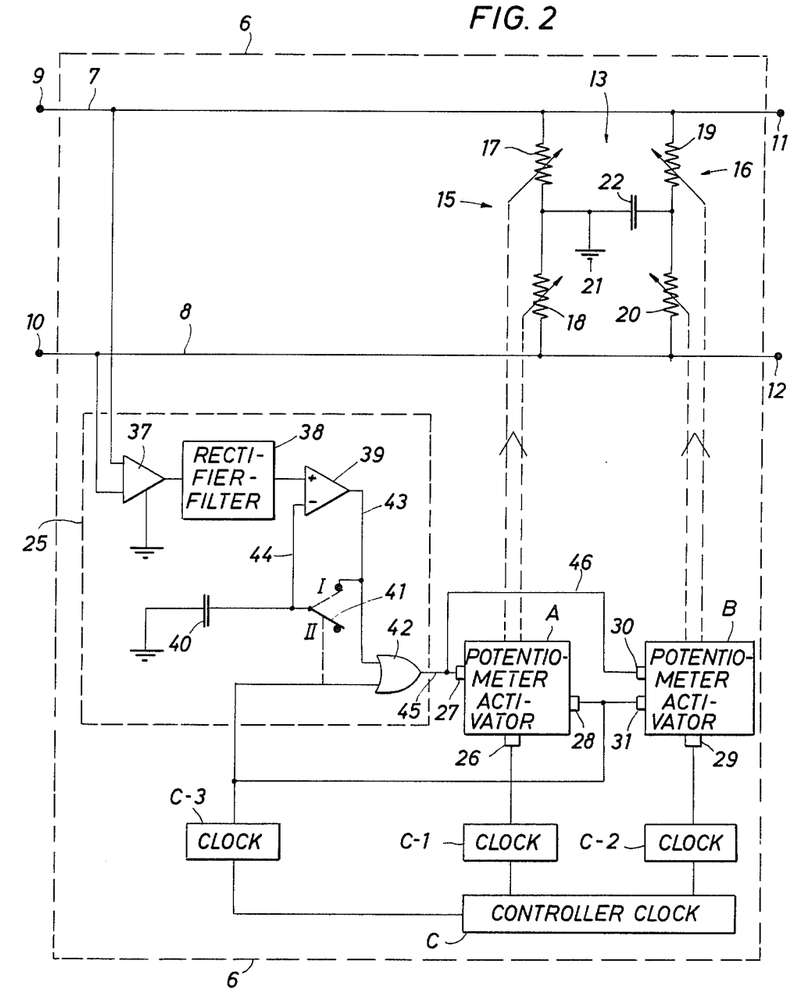
FIG. 2 shows the block diagram of an automatic balancing apparatus according to the invention, wherein adjusting and re-adjusting of the impedances of the arms of the balancing circuit takes place according to the stepwise principle.

Reference is now made to FIG. 2, which shows the balancing apparatus 6 in more detail. The balancing circuit 13 of the apparatus 6 consists of two pairs of arms 15 and 16. The first pair of arms comprises the arms 17 and 18 each consisting of a variable resistance. The second pair of arms comprises two capacitively coupled arms 19 and 20, each arm consisting of a variable resistance that is capacitively coupled to the ground 21 via a capacitance 22. The pairs of arms 15 and 16 are arranged between the leads 7 and 8, and the ground 21.

The variable resistances 17 and 18 of the pair of arms 15 of the balancing circuit 13 form a first potentiometer which is referred to hereinafter by the reference numeral 15. Also, the variable resistances 19 and 20 of the pair of arms 16 form a second potentiometer, which is referred to hereinafter by the reference numeral 16. This second potentiometer 16 is capacitively coupled to the ground 21 through the capacitance 22 (as referred to above).

The potentiometer 15 can be adjusted by the activator A. This activator A is capable of adjusting the potentiometer 15 either by a single step, whereby the values of the resistances 17 and 18 are varied by equal values but in opposite sense to one another, or by a double step, whereby the values of the resistances 17 and 18 are varied in opposite sense to one another by equal values that are double the values that result from the single-step adjustment.

The potentiometer 16 can be stepwise adjusted by the activator B, the adjustment being performed in the same manner as described with reference to the activator A and the potentiometer 15. It will be appreciated that the potentiometers 15 and 16 may differ in size, and that the stepwise adjustments of the potentiometers 15 and 16 may differ from one another in size as well.

Details of the activators A and B, and of the potentiometers 15 and 16 will be described herinafter with reference to FIG. 4 of the drawings.

The automatic balancing apparatus 6 according to the invention as shown in FIG. 2 comprises apart from the balancing circuit 13 and the activators A and B, means to periodically operate the activators in a desired sequence, and to allow them to carry out single-step adjustments or double-step re-adjustments of the potentiometers 15 and 16, depending on the circumstances. Thereto, the activators A and B are controlled by the clocks C-1 and C-2, respectively, which clocks in their turn are controlled by the clock C. Further, both activators simultaneously receive control signals from a clock C-3 (which in its turn is also controlled by clock C). Finally both activators simultaneously receive signals from the detection and decision circuit 25, which will be described hereinafter in greater detail.

The clock C-1 supplies pulses to the entry 26 of the activator A, which activator will respond to each pulse by adjusting the potentiometer 15 one step in a predetermined sense (hereinafter indicated as the "positive" sense) provided that a high-voltage signal is generated by the detection and decision circuit 25 and supplied to the entry 27 of the activator A, and at the same time a high-voltage signal is generated by the clock C-3 and supplied to the entry 28 of the activator A. If this latter signal has a low voltage, the potentiometer will be adjusted in a "negative" sense. The pulse generated by the clock C-1 will not influence the position of the potentiometer 15 if the detection and decision circuit 25 generates a low-voltage signal that is supplied to the input 27 of the activator A.

Activator B is controlled by the detection and decision circuit 25 and the clocks C, C-2 and C-3 in a manner similar to the way in which this circuit 25 in combination with clocks C, C-1 and C-3 controls the operation of the activator A. The inputs 29, 30 and 31 of the activator B correspond with the inputs 26, 27 and 28, respectively, of the activator A.

The operation of the circuit 25, the clocks C-1, C-2 and C-3, and the activators A and B, as well as the way in which the potentiometers 15 and 16 are being controlled will now be described in greater detail.

Once in each time cycle $T_c$ (see FIG. 3), clock C-1 sends a pulse 33 to the activator A, which pulse is passed on by activator A to adjust the potentiometer 15 by a single step in the "positive" sense. Clock C-2 periodically sends (at intervals $T_c$) a pulse 34 to the activator B, which pulse is passed on by the activator B to adjust the potentiometer 16 by a single step in the "positive" sense. The time span between the pulses 33 and 34 is $\frac{1}{2}T_c$.

Figure 3:
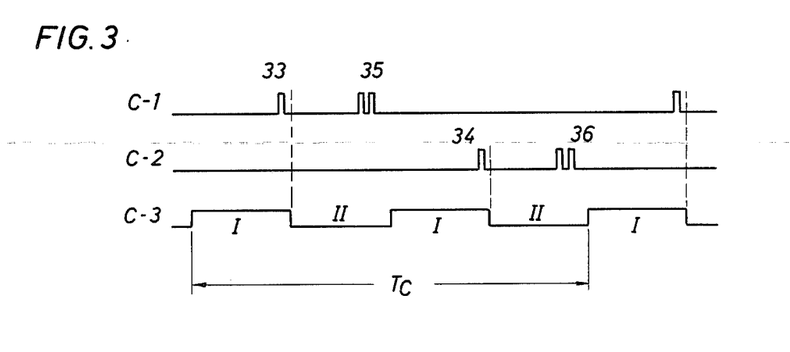
FIG. 3 shows the control signals used in the apparatus in FIG. 2.

The potentiometer 15 can be re-adjusted in a "negative" sense (that is, in a sense opposite to the adjustment resulting from the pulse 33) by the pair of pulses 35 raised by the clock C-1 and supplied to the activator A. The activator A, however, can only pass on these pulses 35 to re-adjust the potentiometer 15 if the unbalance of the bridge circuit comprising the geophone group 1, the electric leads 2, 3 of the cable 4, the balancing circuit 13, and part of the recording system 5 has been increased by the adjustment thereof that originates from the pulse 33. In case the pulse 33 creates a decrease in the unbalance of the bridge circuit, the pair of pulses 35 is not passed on by the activator A, and potentiometer 15 consequently remains in the same position.

As can be seen from FIG. 3, pulse 34 (generated by the clock C-2) is followed by a pair of pulses 36. This pulse pair is periodically raised by the clock C-2 (at intervals equal to $T_c$) and will be passed by activator B to re-adjust the potentiometer 16 if the unbalance of the bridge circuit has been increased as a result of the action of pulse 34. The potentiometer 16 will then be re-adjusted in a "negative" sense (that is in a sense opposite to the sense of the adjustment originating from the action of pulse 34).

The size of the steps by which the potentiometers 15, 16 are re-adjusted as a result of the action of each pair of pulses 35 and 36, respectively, will be double the size of the adjustment steps originating from each pulse 33 and 34, respectively. The re-adjustment resulting from the action of a pulse pair will therefore be referred to hereinafter as a two-step re-adjustment in a negative sense.

The decision whether or not to allow the pulse pairs 35 and 36 to re-adjust the potentiometers 15 and 16, respectively, is taken by the detection and decision circuit 25. This circuit comprises a logarithmic amplifier 37, a full wave rectifier and filter 38, an operational amplifier 39, a capacitance 40, a switch 41, and an OR-gate 42. The inputs of the amplifier are coupled to the leads 7 and 8 of the balancing apparatus 6.

The switch 41 is operated by the signal originating from the clock C-3 (which clock in its turn is controlled by the clock C). Clock C-3 has a cycle equal to $\frac{1}{2}T_c$ and produces a high-voltage signal over each period I and a low-voltage signal over each period II. This signal controls the position of switch 41 such that the output signal of the amplifier 39 is fed back over each period I through the lines 43 and 44 to the inverting input of this amplifier, so that the amplifier 39 operates as a voltage follower. The output of the amplifier 39 is at the same time electrically coupled to one side of the capacitance 40 over the period I. Over the succeeding period II, the capacitance 40 is disconnected from the output of the amplifier 39 (by switch 41 being in position II thereof) and the capacitance 40 will consequently act over the period II as a memory of the voltage appearing at the output of amplifier 39 at the end of the period I.

The voltage appearing at the output of the amplifier 39 at the end of each period I is representative of the unbalance of the bridge circuit consisting of the group of geophones 1, the electrical leads 2 and 3 of the electrical cable 4, the balancing circuit 13 of the automatic balancing apparatus 6, and part of the recorder 5.

By adjusting any one of the potentiometers of the balancing circuit 13, a new unbalance will be obtained and the voltage signal raised by the amplifier 37 and the full wave rectifier and filter 38 is then representative of this new unbalance. This new voltage signal is supplied to the "+" input of the amplifier 39 over the next period II, and the former voltage signal (that is being memorized by the capacitance 40) is supplied to the inverting input of the amplifier 39 which then acts as a comparator comparing the new voltage signal with the former voltage signal. In case the new signal is larger than the old signal, which means that the unbalance of the bridge circuit has been increased, a positive signal will be raised by the amplifier/comparator 39. This positive signal is supplied through the line 43 to one of the inputs of the OR-gate 42 over the period II. The signal supplied to the other input of this OR-gate 42 originates from the clock C-3, this signal having a low voltage over period II. Consequently, the signal generated at the output of the gate 42 is a high-voltage signal which signal is passed on via the lines 45 and 46 to the inputs 27 and 30 of the activators A and B, respectively. At the same time, inputs 28 and 31 of the activators A and B, respectively, receive a low-voltage signal from the clock C-3, which sets the activators to re-adjust the potentiometers 15 and 16, respectively, in a negative sense under influence of the pairs of pulses 35 and 36, respectively. In case the OR-gate 42 would have supplied a low-voltage signal to the activators A and B, the action of these activators would have been blocked, which means that they would not have been influenced by pulses supplied to their entries 26 and 29, respectively. The OR-gate 42 will supply the low-voltage signal in case the amplifier/comparator 39 has detected a decrease in the unbalance of the bridge as a result of the adjustment thereof following any one of the single pulses 33 and 34.

The time span between a pair of pulses 35, 36 and the start of the period II wherein the pair of pulses occurs is preferably a multiple of one period of the ground current frequency. In one embodiment of the invention, this time span was chosen as 120 msec, which is a multiple of one period of $16\frac{2}{3}$ Hz as well as of 50 Hz and of 60 Hz. It is observed that the timing of the pulses 33 and 34 and the delay characteristics of the amplifier 37 together with the rectifier/filter 38 should be interrelated in such a way that a substantial part of the variation of the output signal of the amplifier/comparator 39 resulting from a single pulse 33 or 34 appears in this time span.

The following Table I shows a concise survey of the abovedescribed actions:

TABLE I

| clocks | | | output of circuit 25 | sense of adjustment of: | |
|---|---|---|---|---|---|
| C-1 | C-2 | C-3 | | potentiometer 15 | potentiometer 16 |
| ↑ | 0 | + | + | postive | — |
| ↑ | 0 | 0 | + | negative | — |
| ↑ | 0 | 0 | 0 | — | — |
| 0 | ↑ | + | + | — | positive |
| 0 | ↑ | 0 | + | — | negative |
| 0 | ↑ 0 | 0 | — | — | — |

↑ = positive pulse
+ = high voltage
0 = low voltage
— = no action

The operation of the activators A and B and the potentiometers 15 and 16 will now be described in more detail with reference to FIG. 4.

Figure 4:
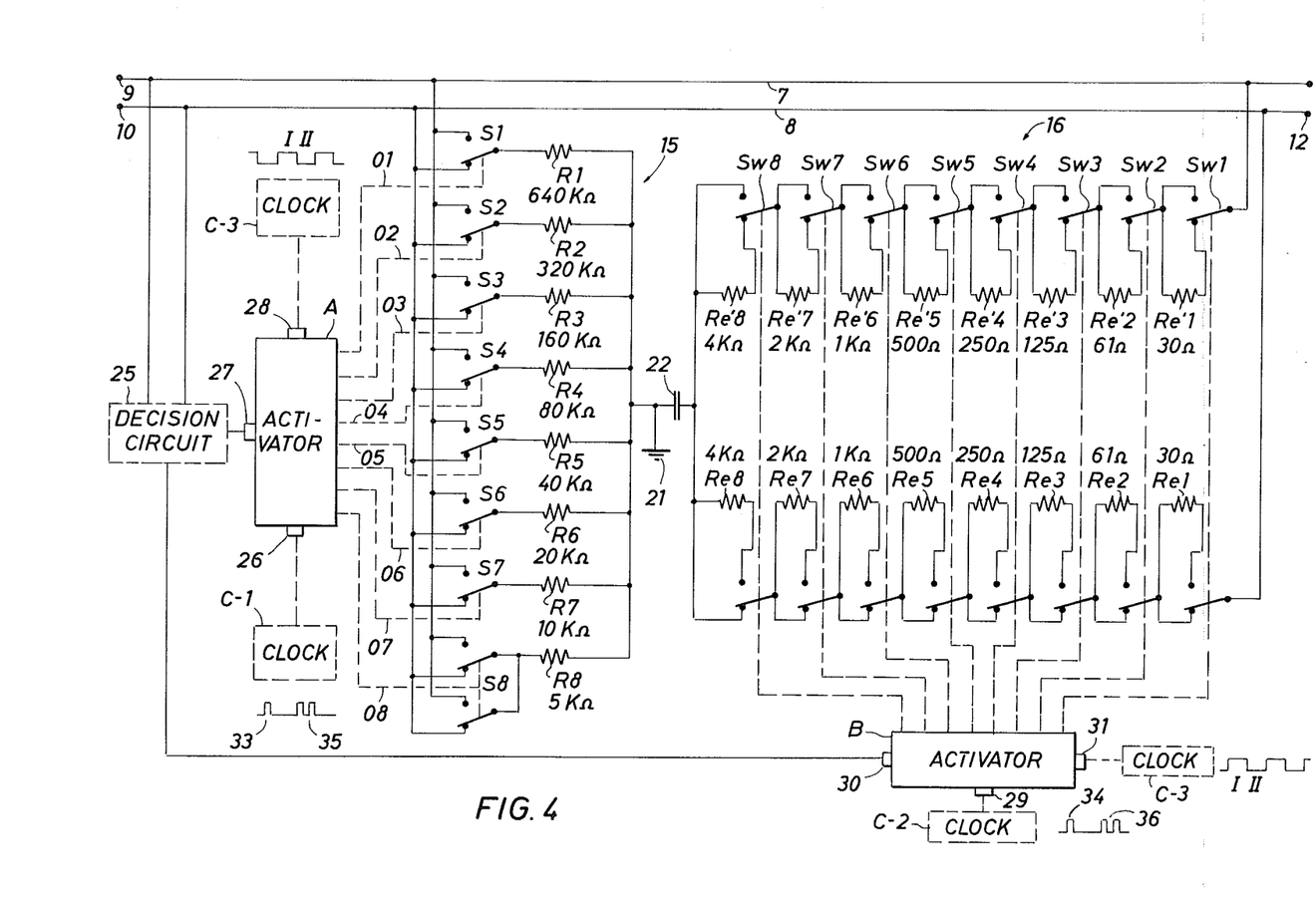
FIG. 4 shows the block diagram of a balancing circuit comprising two stepping potentiometers of alternative designs, which circuit may be applied in the balancing apparatus shown in FIG. 2.

In FIG. 4, two different types of potentiometers (15, 16) are shown by way of example. Both potentiometers are of the electronic type and adjustment and re-adjustment of the potentiometer 15 may be performed by eight electronic change-over switches S1–S8, whereas potentiometer 16 may be adjusted and re-adjusted by eight electronic change-over switches Sw1–Sw8.

The activator A is an 8-bit binary counter having the inputs 26, 27 and 28 electrically connected to clock C-1, the output of the detection and decision circuit 25, and clock C-3, respectively. The pulses generated by clock C-1 will change the position of the various switches S1–S8 of the potentiometer 15 only if there is a high-voltage signal on the input 27 of the activator. Depending on the voltage of the signal that is supplied to the input 28 of the activator, the binary counter A will either increase (high voltage) or decrease (low voltage) the value of the binary code at the outputs 01–08, thereof. The switches S1–S8 are arranged such that they can electrically connect the resistances R1–R8 at will between the ground 21 and either the lead 7 or the lead 8. It is observed that the resistance R8 having the smallest value of the resistances R1–R8 cooperates with a switch S8 whose contacts are doubled to minimize error caused by switch resistance.

In the position shown in FIG. 4, the switches S1–S8 are all set to connect the resistances R1–R8 between the ground 21 and the lead 8. Provided that there is a high-voltage signal on the inputs 27 and 28 of the activator A, a single pulse supplied to the input 26 thereof will put the switch S1 in its other position, as a result whereof the resistance R1 will be coupled between the ground 21 and the lead 7, thereby adjusting the potentiometer 15 in a pre-determined sense (which is indicated hereinafter as the positive sense for reference reasons).

A further pulse on the input 26 will reset switch S1 in its former position, and at the same time put S2 in a position wherein the resistance R2 is arranged between the ground 21 and the lead 8, thereby further changing the impedance of the pair of arms of the potentiometer 15 such that the properties of the balancing circuit of which the potentiometer 15 forms part, are varied.

The properties can be further changed by consecutively feeding more pulses to the input 26 of the activator A. As long as a high-voltage signal is on input 28, the outputs 01–08 of the counter forming the activator A will add, and the resistance between the lead 7 and the ground 21 will decrease, whereas the resistance between the lead 8 and the ground 21 will simultaneously increase. By feeding a low-voltage signal to the input 28 of the activator A, this process will reverse and the potentiometer 15 will be re-adjusted stepwise in a negative sense. Further, a low-voltage signal supplied to the input 27 will block any activity of the activator A.

As explained above, the signal supplied to the input 27 originates from the detection and decision circuit 25 and such signal will have a high voltage in each period I when the single pulse 33 (see FIG. 3) has to vary the setting of the potentiometer 15 by a certain pre-determined value in a positive sense. This signal will also have a high voltage in each period II if the single pulse 33 in the preceding period I has varied the resistances of the arms of the potentiometer 15 in a sense that has resulted in an increase of the unbalance of the bridge circuit including the geophones 1, the cable 4, the balancing apparatus 6 and part of the recorder 5 (see FIG. 1). The potentiometer 15 will then be re-adjusted by varying the resistances of the arms thereof in a negative sense. Such re-adjustment of the potentiometer is stepwise, and results from the clock C-3 supplying a low-voltage signal in period II to the entry 28 of the activator A, thereby allowing the binary counter forming this activator to count down two digits as commanded by the pair of pulses 35 in this period II. Thus, adjustment of the potentiometer 15 (at the end of a period I) in a sense that increases the unbalance of the bridge circuit including this potentiometer will be followed by a re-adjustment of the potentiometer in the succeeding period II, as a result whereof the unbalance is decreased. Since the adjustment in the positive sense results from a single pulse and the re-adjustment (in the negative sense) from a pair of pulses, this re-adjustment will result (when using resistances R1–R8 of the values indicated in FIG. 4) in a variation of the impedance of the arms of the potentiometer that is (in absolute value) twice the variation of said impedances as results from a single pulse.

It will be appreciated that the operation of the activator A should be blocked in case the single pulse at the end of period I has adjusted the potentiometer 15 in a sense wherein the unbalance of the bridge circuit is decreased. The circuit 25 then supplies a low-voltage signal to input 27 of the activator A, thereby blocking this activator against the action of the pair of pulses following in the succeeding period II.

The potentiometer 16 shown in FIG. 4 differs from the potentiometer 15 in that it comprises a double row of resistances Re1, Re'1, Re2, Re'2, etc. and in that the switches Sw1–Sw8 have double contacts. Actuation of switch Sw1 adds the value of the resistance Re1 to the arm between the lead 8 and the capacitance 22, whereas at the same time it subtracts the value of the resistance Re′1 from the arm between the lead 7 and the capacitance 22. Such actuation of the switch Sw1 results from a pulse supplied to the input 29 of the 8-bit binary counter forming the activator B, this pulse originating from the clock C-2. Further, the inputs 30 and 31 have a high-voltage signal supplied thereto. The binary counter B counts "up" as long as pulses are supplied to the input 29, thereby stepwise increasing the impedance of the arm between lead 8 and capacitance 22 and at the same time stepwise decreasing the impedance of the other arm of the potentiometer 16 (which extends between the lead 7 and the capacitance 22). This adjustment of the potentiometer is in a sense that is referred to hereinafter as the positive sense.

By supplying a low voltage signal to the input 31, the 8-bit binary counter forming the activator B will count down each time that a pulse is supplied to the input 29 thereof, thereby re-adjusting the potentiometer by varying the impedances of the arms formed by the potentiometer 16 in a negative sense.

In case a low-voltage signal originates from the detection and decision circuit 25 (which means that the single pulse 34 at the end of a period I has adjusted the otentiometer 16 in the required sense to decrease the unbalance of the bridge circuit) this low-voltage signal on the input 30 of activator B will block this activator and prevent the pair of pulses 36 in the succeeding period II from influencing the position of the potentiometer 16. However, in case a high-voltage signal originates from the circuit 25, which is a sign that the single pulse 34 has generated an adjustment of the potentiometer 16 that increased the unbalance of the bridge circuit, this high-voltage signal will allow the pair of pulses 36 to command the activator B to count down two counts, thereby re-adjusting the potentiometer 16. If the resistances Re1, Re′1, ..., Re8, Re′8 have been properly chosen, this re-adjustment which is a two-step re-adjustment in the negative sense succeeding a one-step adjustment in the positive sense, corresponds with a single one-step adjustment in the negative sense. The unbalance of the bridge circuit will consequently be decreased by the two-step re-adjustment succeeding a one-step adjustment in the wrong direction.

Since the activators A and B are alternately in operation, each operative cycle thereof will further decrease the unbalance, until a minimum has been reached. The operative cycles of the activators may then be interrupted by blocking the outputs of the clocks C-1 and C-2. Subsequently, a seismic disturbance may be created and the seismic waves returning to the earth surface may be detected by the group of geophones. The electrical signals generated by these geophones 1 are then passed through the leads 2, 3 and 7, 8 to the recording system 5 (see FIG. 1). Since the leads form part of the bridge circuit that has been optimally balanced by the potentiometers 15 and 16, there will be very little interference from ground currents that have entered the leads 2 and 3 through resistive leakages and capacitive couplings to the ground. It will be appreciated that the electrical signals that are now recorded by the recording system are more representative of the seismic waves detected by the group of geophones than would be the case if the bridge circuit would not have been optimally balanced.

In an alternative mode of operation, the automatic balancing system according to the invention may be kept operative during the passage of the electrical signals through the leads 7 and 8 of the apparatus.

Figure 5:
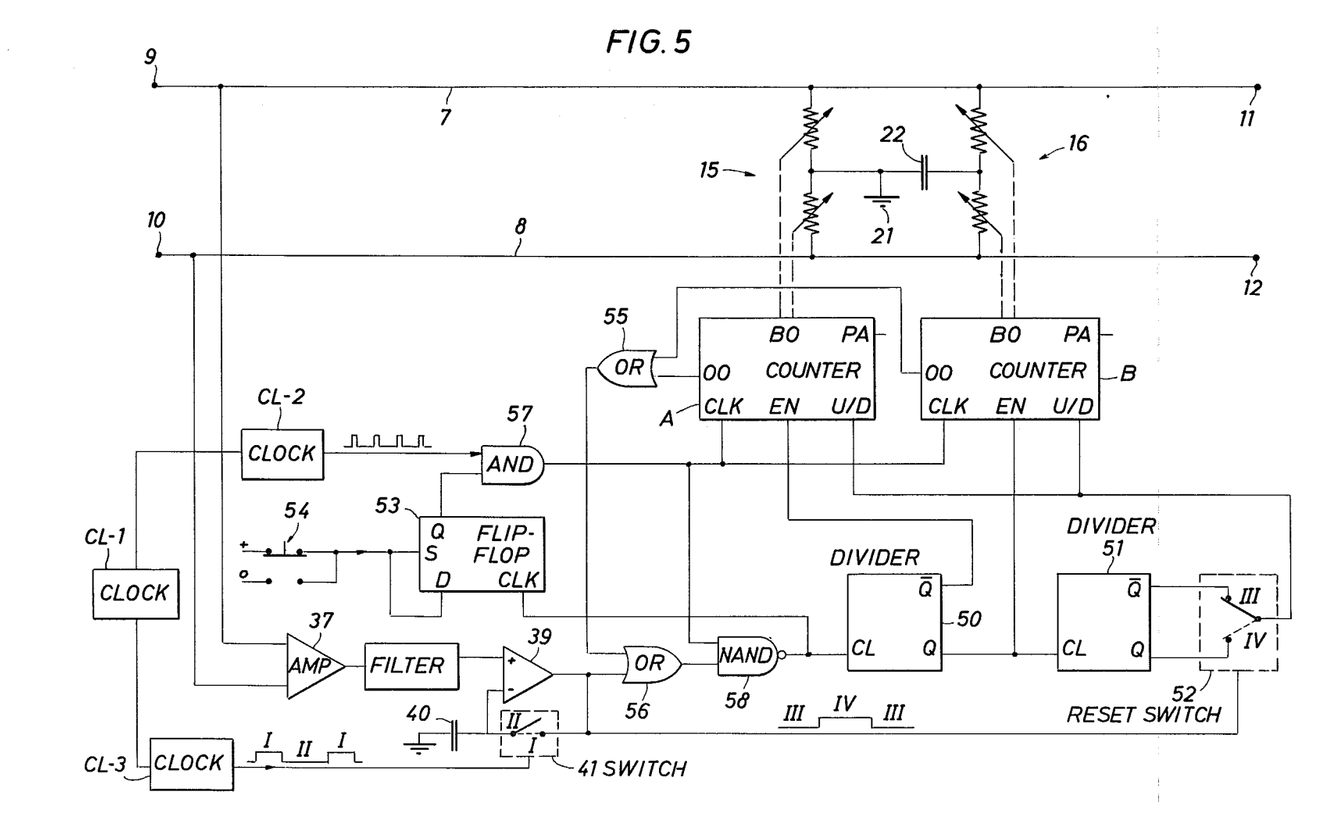
FIG. 5 shows the block diagram of an automatic balancing apparatus, wherein the adjusting and re-adjusting of the variable impedances of the arms of the balancing circuit takes place according to a stepwise pattern that differs from the one applied in the apparatus of FIG. 2.

FIG. 5 of the drawing shows the block diagram of an automatic balancing apparatus according to the invention wherein the adjusting and re-adjusting steps take place according to a pattern that differs from the one applied in the apparatus of FIG. 2. Where parts are used that are identical to those in FIG. 2, identical reference numbers have been applied.

The leads 7 and 8 of the apparatus shown in FIG. 5 have terminals 9, 11 and 10, 12, respectively, attached to the ends thereof for electrically connecting the balancing apparatus between the leads of the cable 4, and the recorder 5 (see FIG. 1).

The balancing circuit consists of the potentiometers 15 and 16 (which may be of the electronic type as shown in FIG. 4), that are electrically coupled by a capacitance 22. The connection between the potentiometer 15 and the capacitance is grounded at 21.

The balancing apparatus further comprises the following components:

a logarithmic amplifier 37 for amplifying the voltage difference indicating the degree of unbalance of the bridge circuit of which the balancing circuit comprising the arms formed by the potentiometers 15 and 16, and the capacitance 22 form part;

a full wave rectifier and filter 38;

an amplifier/comparator 39 which in position II of the switch 41 compares the absolute values of the signal amplified by the amplifiers 37, 38 in two successive periods, and replaces in position I of the switch 41 the value of the signal stored in capacitance 40 by the value thereof in a succeeding period;

a binary divider 50 with complementary outputs Q and $\overline{Q}$ controlling the operation of the counters A and B, and of the binary divider 51;

a binary divider 51 with complementary outputs Q and $\overline{Q}$ for controlling the direction of counting (up or down) of the counters A and B;

a switch 52 for reversing the Q- and $\overline{Q}$-output of the divider 51 to the counters A and B, the positions III and IV of said switch being controlled by the voltages raised over the periods III and IV, respectively, by the amplifier/comparator 39;

counters A and B, each counter having
 a clock entry CLK,
 an enable entry EN,
 an "up/down" entry U/D, a binary output BO for controlling the position of the potentiometer coupled thereto (in a manner described previously with reference to FIG. 4),
 an "overflow" output 00 indicating the maximum and minimum position of the binary output BO, and
 a "pre-adjustment" input PA for adjusting the position of the binary output BO prior to starting the counter;

a D-flipflop 53 used for holding the balancing procedure of the apparatus at a convenient moment by changing the position of the switch 54 to close the lower contacts thereof;

a clock CL-1 synchronizing the operation of the clocks CL-2 and CL-3;

a clock CL-2 periodically generating positive clock pulses (see FIG. 6) at suitably chosen intervals (150 msec. in one embodiment of the invention);

a clock CL-3 periodically generating signals (see FIG. 6) for operating the switch 41; and an OR-gate 55, an OR-gate 56, an AND-gate 67, and a NAND-gate 58, the functions of which will be described hereinafter.

The operation of the balancing apparatus of FIG. 5 is as follows.

Figures 6, 7:
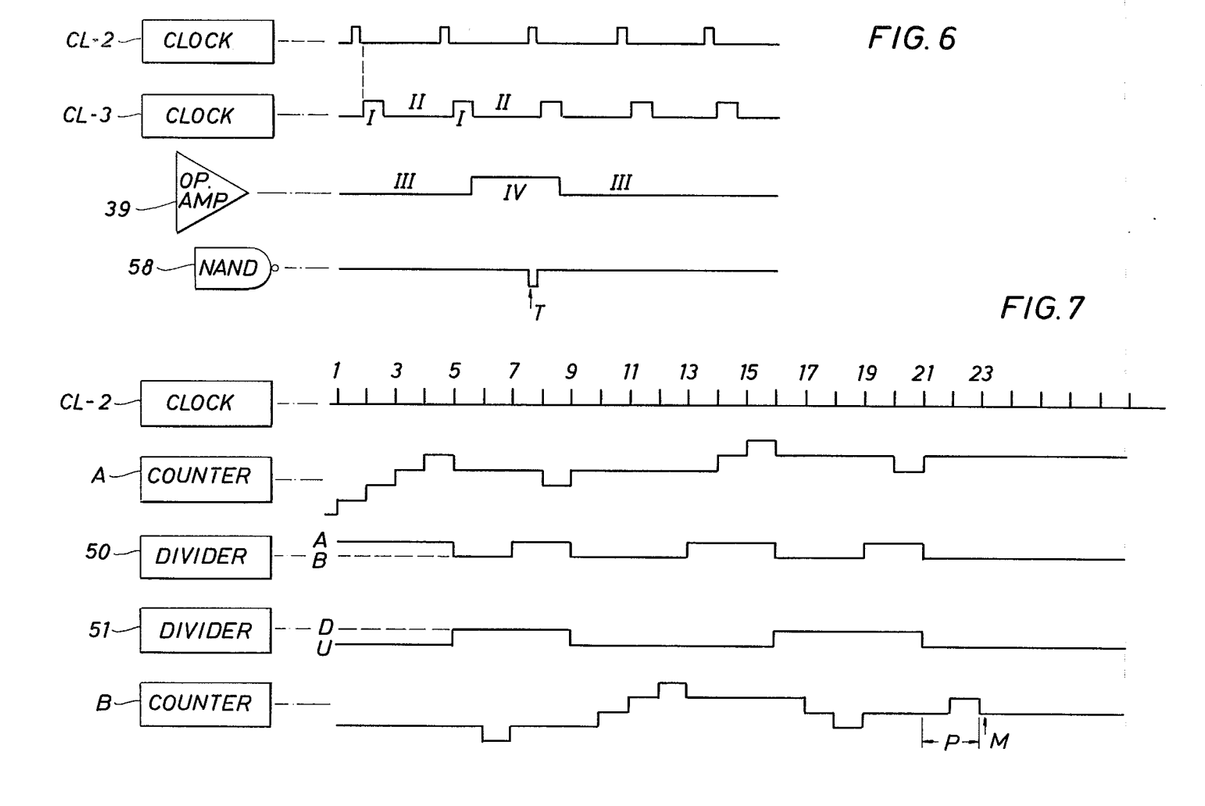
FIG. 6 shows the control signals used in the apparatus of FIG. 5.
FIG. 7 shows the signals used in a balancing procedure of the apparatus of FIG. 5.

The switch 54 is in the upper position thereof, and the Q-output of the D-flipflop 53 will consequently supply a positive voltage to the AND-gate 57, which latter then passes the CL-2 clock pulses to the counters A and B, as well as to the NAND-gate 58. Assuming that neither of the counters A nor B is in the maximum or the minimum position, the signals at the overflow outputs 00 of the counters A and B will be zero, which makes the output of the OR-gate 55 also zero. The output signal of the amplifier/comparator 39 will then be passed through the OR-gate 56 to the NAND-gate 58. This latter gate 58 will only pass a CL-2 clock pulse (but in inverted form as shown in FIG. 6) when the output of the OR-gate 56 is positive over the period that said CL-2 clock pulse is passed to the gate 58. This period is within the period II of clock CL-3 in which period the switch 41 is in the position II and the comparator 39 measures whether the unbalance of the bridge circuit has been increased or decreased as a result of a previous adjustment of one of the potentiometers 15, 16.

In case of a decrease of the unbalance, the amplifier/comparator 39 will generate a zero output signal III (see FIG. 6) which generates in combination with the zero output signal of the OR-gate 55, a zero output signal at the OR-gate 56. This latter zero signal is supplied to the NAND-gate 58 and generates a positive output signal therein irrespective of the positive pulses supplied by the clock CL-2 to the NAND-gate 58. Consequently, the outputs of the binary dividers 50, 51 remain unchanged and the next adjustment of the potentiometer 15 or 16 remains in the direction wherein the unbalance of the bridge circuit is decreasing.

In case of an increase of the unbalance of the bridge circuit as a circuit of an adjustment of one of the potentiometers 15, 16, the amplifier/comparator 39 will generate a positive voltage signal IV (see FIG. 6) which generates in combination with the zero output signal of the OR-gate 55, a positive output signal at the output of the OR-gate 56. This latter signal is supplied to the NAND-gate 58 and generates an inverse pulse at the output thereof (see FIG. 6) when a positive CL-2 clock pulse is supplied to the NAND-gate 58. The inverse pulse is supplied to the CL-entry of the binary divider 50 and the trailing (positive) edge of this pulse reverses the outputs Q and $\bar{Q}$ of the binary divider 50, which results in the next CL-2 clock pulse actuating the counter B in case the last step of counter A has generated an increase of the unbalance, and vice versa.

It will be appreciated that the up/down signal of the $\bar{Q}$-output of the binary divider 51 is reversed only either by switching the switch 52 to position IV, or by a change of the Q-output of the binary divider 50 from zero to a positive voltage. The actuation of the switch 52 only influences the direction of the counting step resulting from the next CL-2 clock pulse, whereas the positive flank of the signal supplied to the CL-input of the divider 51 may influence a plurality of counting steps resulting from the succeeding pulses.

Only one of the two potentiometers 15, 16 is being adjusted at a time. Assuming that the $\bar{Q}$-output of the binary divider 50 is positive, and the $\bar{Q}$-output of the binary divider 51 is zero, then the counter A will be counting in the "up" direction (see FIG. 7 over the period indicated by the CL-2 clock pulses No. 1–No. 4) and the potentiometer 15 will be adjusted in a direction that is for reference reasons herein indicated as the "positive" direction. The adjustment steps are controlled by the CL-2 clock pulses No. 1–No. 4 that are supplied to the CLK-entry of the counter A. The variation of the unbalance of the bridge circuit is measured by the comparator 39 after each adjustment step, and if a step, say the step generated by the pulse No. 4, results in an increase of the unbalance, the balancing circuit will correct the adjustment generated by pulse No. 4 by a re-adjustment of the potentiometer 15 with a value equal to the value of an adjustment step. Such re-adjustment is controlled by the switch 52 which reverses the Q- and $\bar{Q}$-outputs of the binary divider 51 when under influence of a positive signal IV generated by the comparator 39 (as has been explained above with reference to FIG. 6). The next CL-2 clock pulse No. 5 still actuates the counter A but now in a reverse direction (thereby re-adjusting the potentiometer 15 in a negative sense), and the same clock pulse No. 5 passes through the NAND-gate 58 which then generates an inverse pulse that is supplied to the CL-entry of the binary divider 50. The trailing positive edge of this inverse pulse reverses the signs of the Q- and $\bar{Q}$-output of this binary divider 50. Since the Q-output of the divider 50 is changed from zero to a positive voltage, the outputs Q and $\bar{Q}$ of the binary divider 51 will also be reversed. As a result thereof the $\bar{Q}$-output of the divider 51 has a positive voltage, and the CL-2 clock pulses No. 6 will now actuate the counter B in the "down" direction.

As long as the adjustment of the potentiometer 16 generated by the downward counting of counter B results in a decrease of the unbalance of the bridge circuit as detected by the comparator 39, the counter B will continue to count down at each next CL-2 clock pulse in the same manner as described with reference to counter A hereinabove.

However, in case the adjustment of potentiometer 16 resulting from the first downward count of counter B is in the wrong direction, the comparator 39 will detect an increase in unbalance and actuate the switch 52 to position IV, as a result whereof the next CL-2 clock pulse No. 7 will command the counter B to count one step up thereby re-adjusting the potentiometer 16 to its original position. At the same time, the negative edge of this CL-2 clock pulse No. 7 is reversed by the NAND-gate 58 to a positive edge which reverses the signs of the Q- and $\bar{Q}$-output of the binary divider 50, such that the next CL-2 clock pulse No. 8 will actuate the counter A. It is observed that the counter A will now count down since this reversal of the Q- and $\bar{Q}$-output of the divider 50 includes a decrease in voltage of the Q-output which decrease will not actuate the divider 51, as a result whereof the Q- and $\bar{Q}$-output thereof will not be reversed.

CL-2 clock pulse No. 8 now commands counter A to count one step down, which adjusts potentiometer 15 in a sense that increases the unbalance of the bridge circuit. The leading positive edge of pulse No. 9 will consequently re-adjust the potentiometer 15, and the trailing negative edge thereof will be translated into a positive edge by the NAND-gate 58, which positive edge will reverse the output of the divider 50 thereby allowing pulse No. 10 to actuate counter B but now in an upward direction since pulse No. 9 has not only reversed the outputs of divider 50, but has also reversed the outputs of divider 51.

The Cl-2 clock pulses No. 10 and No. 11 to counter B result in stepwise adjustments of the potentiometer 16 which adjustments decrease the unbalance of the bridge circuits as detected by the comparator 39. The stepwise adjustment originating from pulse No. 12, however, increases the unbalance and pulse No. 13 will consequently re-adjust the potentiometer 16 to the position thereof that was obtained under influence of pulse No. 12.

Pulse No. 13 has reversed the outputs of the divider 50 (but has not influenced the outputs of the divider 51) and pulse No. 14 will consequently order counter A to count upwards. Since the adjustments of potentiometer 16 have influenced the balancing of the bridge circuit, and also the optimal position of the potentiometer 15, this latter potentiometer must be further adjusted again to further decrease the unbalance of the bridge circuit. Pulse No. 14 now adjusts potentiometer 15 one step in the positive direction, which happens to be the required direction as is detected by comparator 39, which then allows the counter A to take one further step in this direction. This step is commanded by the pulse No. 15. The resulting adjustment of the potentiometer 15 however, is then found to have increased the unbalance. The comparator 39 then actuates the switch 52 to re-adjust the potentiometer 15 one step by means of the pulse No. 16.

The pulse No. 16 reverses the outputs of both the binary dividers 50 and 51, and the succeeding pulse No. 17 will now command the counter B to count down. The adjustment of potentiometer 16 resulting from the pulse No. 17 is found to decrease the unbalance of the bridge circuit, but the next adjustment thereof that is the result of the pulse No. 18 increases this unbalance and potentiometer 16 is therefore re-adjusted one step by the pulse No. 19.

No decrease of the unbalance is obtained by the next adjustment of the potentiometer 15, which is ordered to the counter A by the pulse No. 20, and this adjustment is consequently corrected by the pulse No. 21, which latter also reverses the outputs of both dividers 50 and 51, such that pulse No. 22 now tries to further decrease the unbalance of the bridge circuit by adjusting potentiometer 16 through the intermediary of the counter B which is ordered to count one up. It appears that this adjustment again increases the unbalance, and the potentiometer is therefore re-adjusted by the pulse No. 23.

Since the optimum balancing position has now been reached by the potentiometers 15 and 16, the balancing procedure may be interrupted by changing the position of the switch 54 to close the lower contacts thereof. The Q-output of the D-flipflop 53 will then become zero after a positive signal is received on the CLX-entry of this flipflop. The zero Q-output will then block the passage of the CL-2 clock pulses through the AND-gate 57. The positive signal to the CLK-entry of the flipflop 53 is generated at a time T indicated in FIG. 6, which coincides with the negative edge of a CL-2 clock pulse that commands a reversal of the signs of the outputs of the divider 50. Since such pulse also generates a re-adjustment of one of the potentiometers, the balancing procedures will be interrupted at the moment of optimal balancing, such as at moment M (see FIG. 7) if the switch 54 has been operated within the period P (see FIG. 7).

The D-flipflop 53 is reset after a seismic recording has taken place, by changing the position of the switch 54 to close the upper contacts thereof. As a result thereof the Q-output will become equal to the S-input. The positive signal of the Q-output is supplied to the AND-gate 57 which then allows the CL-2 clock pulses to pass therethrough.

As has been observed above, the counters A and B can be programmed to be in their mid-position when the balancing operation is started. It will be appreciated that the potentiometers are then in their mid-positions as well. Under particular circumstances it may occur that in adjusting one of the potentiometers (say potentiometer 15), an end-position thereof is reached when the comparator 39 indicates that the last made adjustment has decreased the unbalance of the bridge circuit. Further adjustment in this direction cannot be made, and therefore use is made of the signal that indicates that counter A (which controls the potentiometer 15) has reached a maximum or minimum position. Such signal is released by the overflow output OO of this counter A. This is a positive signal that passes through the OR-gate 55 and OR-gate 56 to the NAND-gate 58, where it allows the trailing negative edge of the CL-2 clock pulse that caused the relevant last made adjustment to generate a positive edge that is supplied to the CL-output of the divider 50. Counter A is subsequently de-activated by the reversal of the Q- and $\overline{Q}$-outputs of this divider whereas counter B is activated. It will be appreciated that the optimal position of the potentiometers for balancing the bridge circuit will thereafter be reached in the manner as described above with reference to FIGS. 5, 6 and 7.

Figure 8:
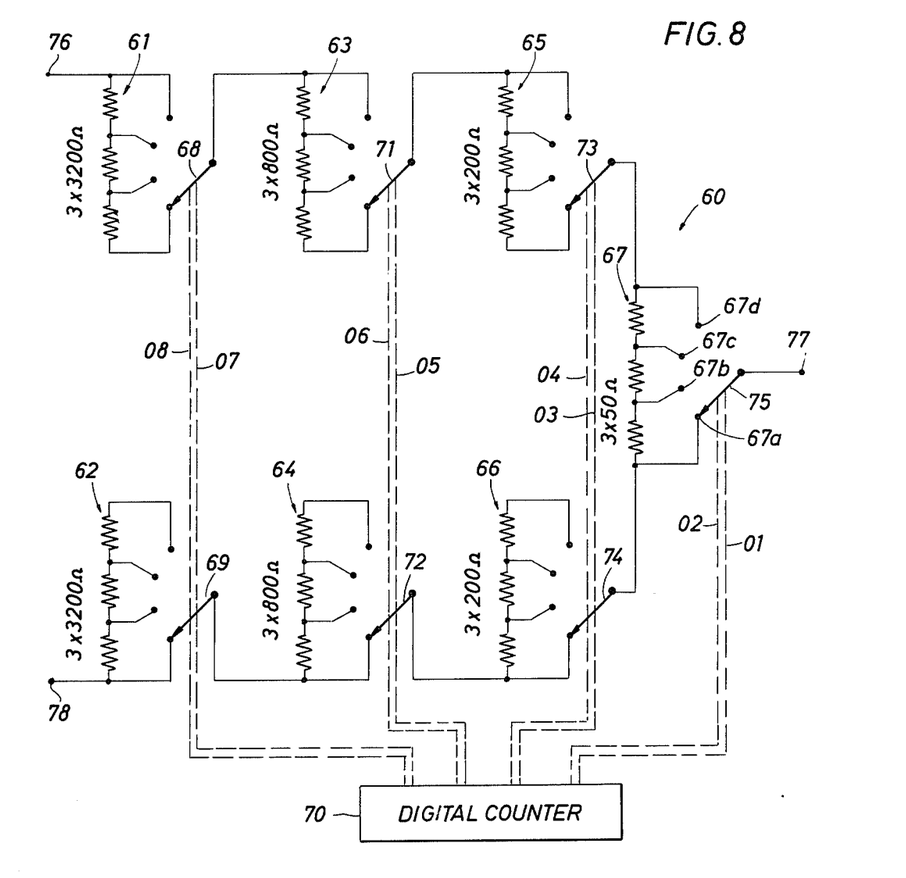
FIG. 8 shows the block diagram of a stepping potentiometer that may be used in any one of the balancing apparatuses shown in FIGS. 2 and 5.

Reference is now made to FIG. 8 of the drawings which shows schematically an electronic potentiometer 60 that may replace any one of the potentiometers applied in the balancing apparatuses shown in FIGS. 2 and 5.

The potentiometer 60 consists of a plurality of resistances that are subdivided in groups 61–67, each group consisting of three resistances. The groups 61 and 62 comprise resistances of equal value, and cooperate with electronic switches 68 and 69, respectively, that can be switched simultaneously in four operative positions by the digital code that is raised by the 8-bit digital counter 70 on the outputs 07 and 08 thereof. Further, the groups 63 and 64 comprise resistances of equal value, but lower than the value of the reistances in the groups 61 and 62. The groups 63, 64 cooperate with the switches 71, 72, respectively, that are controlled by the outputs 05 and 06 of the counter 70. The groups 65, 66 comprise resistances of equal value, but lower than the value of the resistances of the groups 63, 64. The groups 65, 66 cooperate with the switches 73, 74, respectively, that are controlled by the outputs 03 and 04 of the counter 70. Finally, the group 67 consists of resistances of a value lower than the value of the resistances of the groups 65, 66, and cooperates with the switch 75, the position of which is controlled by the outputs 01 and 02 of the counter 70.

The groups 61–67 are electrically interconnected in the manner shown in FIG. 8. In the position of the switches as shown in FIG. 8, the arm extending between the contact points 76, 77 has the maximum resistance, whereas the arm extending between the contact points 78, 77 has a resistance equal to zero. It will be appreciated that the switches operate in pairs 68, 69; 71, 72; and 73, 74 such that each switch of a pair counts up (or down) simultaneously with the other switch of said pair.

The counter 70 on digitally counting upwards will stepwise move the switch 75 along the contacts 67a, 67b, 67c and 67d of the group of resistances 67, thereby stepwise decreasing the resistance of the area between the contact points 76, 77 and stepwise increasing the resistance of the arm between the contact points 78, 77. On further counting, the switch 75 is returned to the contact 67a and the switches 73 and 74 subsequently step one count up simultaneously, whereafter the switch 75 repeats its stepwise upward displacement along the contacts 67b, 67c and 67d, and is subsequently again returned to contact 67a. The switches 73, 74 then move one count upwards, and switch 75 again repeats its upward displacement. By using resistances in the various groups 61–67 of the values indicated in FIG. 8, the electronic potentiometer can be varied in 256 steps of 50 ohms.

Figure 9:
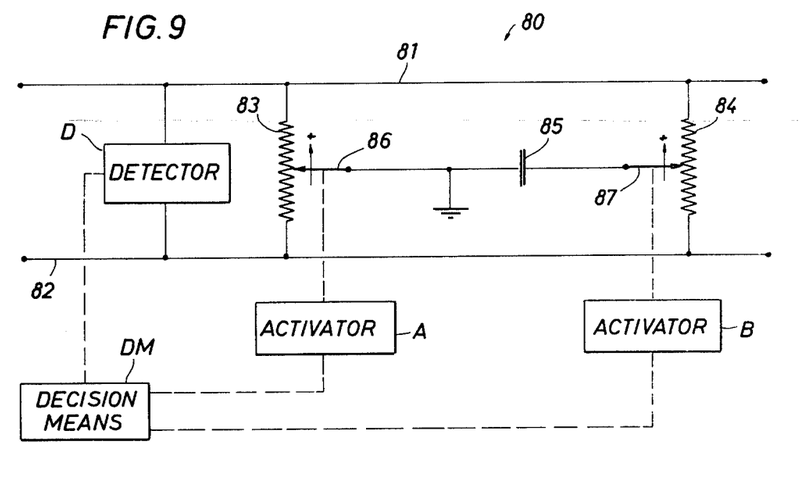
FIG. 9 shows the block diagram of an automatic balancing apparatus wherein the adjusting and re-adjusting of the variable impedances of the arms of the balancing circuit takes place simultaneously.

The variable impedances of the pairs of arms of the balancing circuit applied in the embodiments shown in FIGS. 2 and 5 of the drawings are adjusted and re-adjusted stepwise and in succession of one another, which means that the impedances not belonging to one and of the same pair of arms will not be varied at the same time. However, the invention is not limited to these embodiments. The impedances of different pairs of arms may be varied simultaneously at pre-determined values in pre-determined directions. FIG. 9 shows a block-schematic of such an arrangement of such a balancing circuit.

The balancing circuit 80 of FIG. 9 is designed to replace the circuit 6 in FIG. 1. The potentiometer 83 and 84 are arranged between the leads 81 and 82 (that are arranged for electrically connecting the leads 2 and 3 to the input of the recorder 5). The potentiometers 83, 84 form two pairs of arms of the bridge circuit when the balancing circuit 80 is installed. The sliding contacts 86, 87 of the potentiometers 83, 84, respectively, are electrically interconnected by means of a capacitance 85. One side of the capacitance is grounded.

The activators A and B can stepwise displace the sliding contacts 86 and 87 of the potentiometers 83 and 84, respectively. Detector D can detect increases and decreases of the unbalance of the bridge circuit and will supply information thereon to the decision means DM, which controls the activators A and B simultaneously according to the following pattern.

Starting from the mid-position of the sliding contacts 86, 87, these contacts are displaced one step in the positive sense (see arrows). If a decrease in unbalance is detected by detector D, the decision means DM commands both activators A and B to displace the contacts 86, 87 one step further in the positive sense. This sequence is repeated until an increase in unbalance is detected. The decision means DM then commands the activators A and B to re-adjust the contacts 86, 87 to their previous position (by one step in the negative sense). Subsequently the activators are commanded to displace contact 86 one step in the positive sense, and contact 87 one step in the negative sense. Now there are two possibilities. The unbalance may have decreased; the activators are then commanded to displace the sliding contacts simultaneously and stepwise in these senses as long as each such adjustment results in a decrease of the unbalance. The other possibility is that the unbalance has again increased. The activators are then commanded to return the contacts to their previous position, and subsequently to displace them simultaneously and stepwise each in a sense that is opposite to the sense of the last adjustment step. Thus, contact 86 is displaced one step in the negative sense, whereas contact 87 is displaced one step in the positive sense. The unbalance will then be decreased, and the activators A and B will be commanded by the decision means DM to adjust the contacts 86 and 87 simultaneously and stepwise in these last-mentioned senses as long as the unbalance is decreasing. If the unbalance starts to increase again, the contacts are re-adjusted to their previous position, whereafter the decision means DM commands the activators A, B to adjust the contacts in pre-determined senses (as described above) to further decrease the unbalance to a minimum value.

It will be appreciated that the potentiometers 83 and 84 may be of different size, and that the adjusting steps taken by the contacts 86, 87 may differ from each other in size. Also, the size of the adjusting steps that are taken after each re-adjusting step may differ in value.

In an alternative embodiment, the decision means DM will command the activators A and B to adjust the contacts 86, 87 cyclically at varying values, such as by varying the position thereof so that the amplitudes of the variations change sinusoidally with a 90° phase difference. The variation in unbalance resulting from the cyclic simultaneous adjustment of the sliding contacts is then detected by the detector D with respect to the unbalance existing at the beginning of this cycle. The position of the contacts corresponding to the maximum decrease of the unbalance is then detected and the activators A and B are commanded to re-adjust the contacts to these positions. This cyclic variation of the values of the impedances followed by a re-adjustment thereof to values at which a maximum decrease of the ubalance is reached, is repeated until no further decrease of the unbalance can be reached.

The invention is not restricted to the application of variable impedances that are stepwise varied in a pre-determined sense. If desired, the impedances may be varied continuously. An embodiment of the invention operating according to the continuous principle is shown in FIG. 10 of the drawings.

Figure 10:
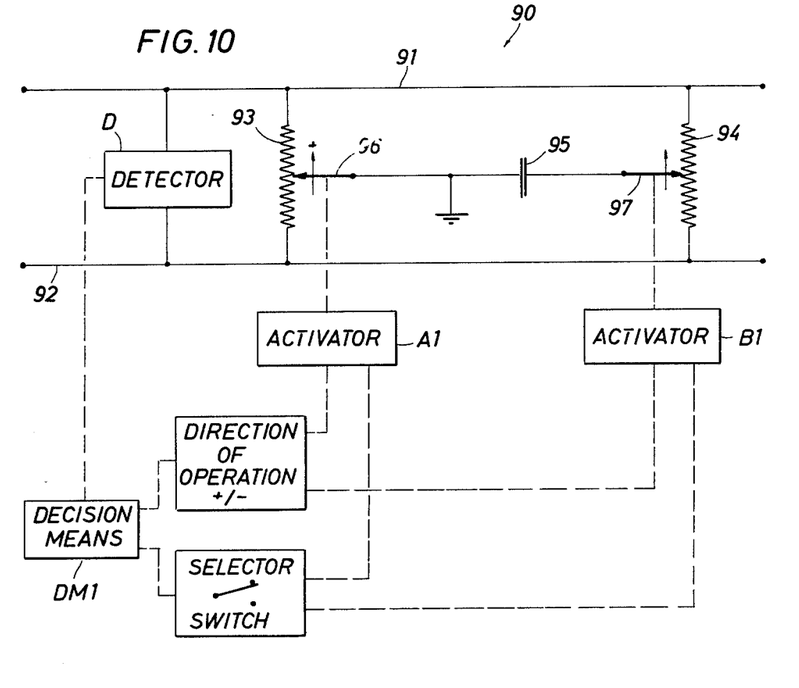
FIG. 10 shows the block diagram of an automatic balancing apparatus wherein the adjusting and re-adjusting of the variable impedances of the arms of the balancing circuit takes place continuously.

The balancing circuit 90 shown in FIG. 10 is designed to replace the circuit 6 in FIG. 1. Between the leads 91 and 92 (that are arranged for electrically connecting the leads 2 and 3 to the input of the recorder 5), the potentiometers 93 and 94 are arranged. The potentiometers form two pairs of arms of the bridge circuit when the balancing circuit 90 is installed. The sliding contacts 96, 97 of the potentiometers 93, 94, respectively, are electrically interconnected by means of a capacitance 95. One side of the capacitance is grounded.

The activators A1 and B1 are servo-mechanisms that can displace the sliding contacts 96 and 97 of the potentiometers 93 and 94, respectively, in a continuous way. Detector D can detect increases and decreases of the unbalance of the balancing bridge and will supply information thereon to the decision means DM1 that decides which one of the activators A1 and B1 should operate and in which direction. The activators A1 and B1 are controlled according to the following pattern:

1. As long as the detector D detects a decrease in the unbalance, the activator that is in operation is allowed to continue to displace the sliding contact activated thereby.

2. When an increase in the unbalance is detected by the detector D, the activator that is in operation will readjust the sliding contact to a position in which the maximum balance is detected. This information is released to the decision means DM1, which commands the other activator to take over, and to displace the contact activated thereby in a pre-determined sense.

2a. If the unbalance decreases, this other activator is allowed to continue its operation.

2b. If the unbalance increases, this other activator is commanded to displace the contact activated thereby in the opposite sense, whereafter a decrease of the unbalance will be detected by the detector D.

3. If the unbalance starts to increase, step 2 followed either by step 2a or by step 2b is repeated.

The activators A1, B1 and the potentiometers 93, 94 having the sliding contacts thereof mechanically coupled to the activators may be replaced by any other means suitable for the purpose such as light sources with variable intensity cooperating with light dependent resistors (LDR). In another embodiment, the activators may be replaced by means adapted to generate a variable electric tension, and the potentiometers are replaced by field effect transistors (FET) having the gates thereof electrically connected to the outputs of the said means. It will be understood that these latter combinations of activators and variable resistances may also be applied in the other embodiments of the invention to replace the activator/impedance combinations used therein.

It will be appreciated that although in the embodiments of the invention as described herein the impedances of the pairs of arms of the balancing circuit are varied by adjusting and readjusting resistors present in the arms, the invention is not limited thereto. If desired, the variable impedances may consist of, or comprise variable capacitors that are operated by the activators to adjust or re-adjust the impedances of the arms.

Further, more than two pairs of arms may be applied in the balancing circuit as described hereinabove. The variable impedances of such arms may than be adjusted according to a desired pattern, either stepwise or continuously.

Finally, it is observed that the use of the balancing circuit according to the invention is not restricted to seismic operations wherein the geophone pattern is similar to the one shown in FIG. 1. The invention may be applied to any other geophone pattern and to any number of seismic channels connecting the geophones to the recording system.

What we claim is:

1. An apparatus for reducing ground current interference with electrical signals representative of seismic wave signals passing from at least one geophone via an electric circuit to a recording system, said apparatus comprising a balancing circuit including one or more pairs of arms, each pair having at least one arm with a variable impedance;

means for electrically connecting said balancing circuit between said electric circuit and ground potential so as to form a bridge circuit in combination with said geophone, said electric circuit and at least a part of said recording system;

means for automatically adjusting said variable impedances of the pairs of arms of said balancing circuit;

detecting means for detecting the variation in unbalance of said bridge circuit; and means for automatically readjusting said variable impedances of said pairs of arms when the unbalance has increased as a result of such adjusting.

2. An apparatus according to claim 1, including interruption means for interrupting the operation of said means for adjusting and said means for readjusting said variable impedance prior to passing said electrical signals through said electric circuit.

3. An apparatus according to claim 1, including adjusting means for stepwise adjusting and readjusting said variable impedances in steps of predetermined sizes; and means for detecting a variation in the unbalance of said bridge circuit at least after each ajusting step.

4. Apparatus according to claim 3, wherein said steps for readjusting said variable impedances are of a size at least equal to said adjusting steps.

5. An apparatus according to claim 3, wherein said steps for readjusting said variable impedances are of a size twice that of said adjusting steps.

6. An apparatus according to claim 3, wherein said steps for adjusting said variable impedances are of non-varying size.

7. An apparatus according to claim 3, including means for measuring the magnitude of said variations in the unbalance; and means for varying the size of said steps for adjusting and readjusting said variable impedance in relation to said magnitude of said variation in the unbalance.

8. An apparatus according to claim 3, wherein each variable impedance comprises two or more impedances of varying sizes switchedly connected by switching means so that any number of said impedances from all to none may comprise said variable impedance by approriate switching.

9. An apparatus according to claim 8, including means for successively switching said impedances in ascending or descending order;

means for readjusting said variable impedance to restore it to its previous value; and means for adjusting said variable impedance in the sense of the preceding readjusting step applied to said variable impedance.

10. An apparatus according to claim 3, wherein said adjusting means includes means for alternately adjusting the variable impedance of each of said arms by a single step.

11. An apparatus according to claim 3, wherein said adjusting means includes means for stepwise adjusting said variable impedances of said arms as long as said means for detecting a variation in the unbalance of said brdige circuit detects a decrease in said unbalance as a result of the preceding step.

12. An apparatus according to claim 2, wherein said interruption means comprises means to interrupt said adjusting and readjusting of said variable impedances in a position at which further adjusting or readjusting of any of said variable impedances would result in an increase in the balance of said bridge circuit.

13. An apparatus according to claim 1, including adjusting means for adjusting and readjusting said variable impedance simultaneously and repeatedly in steps.

14. An apparatus according to claim 13, wherein said means for readjusting said variable impedances include means to restore said variable impedances to their last previous values in a readjusting step; and wherein said adjusting means includes:

means for adjusting said variable impedances in steps of predetermined sizes in predetermined senses as long as said detecting means detect a decrease in the unbalance as a result of said steps;

means for adjusting said variable impedances after said readjusting step such that one of said variable impedances is adjusted in a sense opposite to the sense of said readjusting step; and means for adjusting said variable impedances in steps of predetermined size and in a sense opposite to the sense of the last preceding adjusting step where said detecting means has detected an increase in unbalance as a result of said last preceding adjusting step.

15. An apparatus according to claim 13, wherein said adjusting means include means to cyclically adjust said variable impedances at varying values in successive steps;

wherein said detecting means include means for detecting the variation in unbalance of said bridge circuit continuously with respect to the unbalance at the beginning of each cycle;

including means for detecting the values of said variable impedances at which a maximum decrease of unbalance is generated;

wherein the means for readjusting said variable impedance includes means for readjusting to said last-mentioned values.

16. An apparatus according to claim 1, including means for adjusting and readjusting said variable impedances continuously; and wherein the detecting means include means for periodically detecting variations in the unbalance of the bridge circuit.

17. An apparatus according to claim 1, wherein the detecting means comprises:

a rectifier having one input and an output, said input being electrically coupled to said balancing circuit;

a comparator having two inputs and an output, a first input being electrically connected to said output of said rectifier;

a capacitor, one side of said capacitor being electrically connected to a second input of said comparator, the other side of said capacitor being connected to ground potential;

a switch adapted to periodically connect said output of said comparator to said second input, said output of said comparator being operatively connected to said means for adjusting and readjusting said variable impedances.

18. Method for reducing ground current interference with electrical signals representative of seismic wave signals, said electrical signals passing from at least one geophone to a recording system via an electric circuit including a balancing circuit coupled to ground potential, whereby a bridge circuit is formed which includes the geophone, the electric circuit, and at least a part of the recording system, wherein the balancing circuit comprises one or more pairs of arms, each pair having at least one arm with a variable impedance, said method comprising:

automatically adjusting said variable impedances of said pairs of arms in a predetermined sense;

detecting variations in the unbalance of said bridge circuit; and automatically readjusting the variable impedances in a sense opposite to said predetermined sense if the unbalance has increased as a result of said adjusting.

19. Method according to claim 18, including:

interrupting the operation of said automatic adjusting and automatic readjusting of said variable impedances prior to passing said electrical signals through said electric circuit.

20. Method according to claim 18, including:

stepwise automatically adjusting and readjusting said variable impedances; and detecting a variation in the unbalance at least after each step.

21. Method according to claim 20, including:

measuring the magnitude of said variations in unbalance; and varying the size of said stepwise adjusting and readjusting in relation to said magnitude of said variation in the unbalance.

22. An apparatus for reducing ground current interference with electrical signals representative of seismic wave signals passing from at least one geophone via an electric circuit to a recording system, said apparatus comprising:

a balancing circuit including one or more pairs of arms, each pair having at least one arm with a variable impedance;

means for electrically connecting said balancing circuit between said electric circuit and ground potential so as to form a bridge circuit in combination with said geophone, said electric circuit, and at least a part of said recording system;

a detection and decision circuit for detecting a variation in the balance of said bridge circuit;

a binary counter for adjusting each of said variable impedances and for readjusting each of said variable impedances if an increase in unbalance is detected by said detection and decision circuit after said adjustment; and clock means for causing said adjusting and readjusting of said variable impedance to occur in steps.

23. Apparatus according to claim 22, wherein said steps for readjusting variable impedance are of a size at least equal to said adjusting steps.

24. An apparatus according to claim 22, wherein said steps for readjusting said variable impedances are of a size twice that of said adjusting steps.

25. An apparatus according to claim 22, wherein said steps for adjusting said variable impedances are of a non-varying size.

26. An apparatus according to claim 22, wherein said variable impedance comprises two or more impedances of varying sizes switchedly connected by one or more electronic changeover switches so that any number from all to none may comprise said variable impedance by appropriate switching, said electronic changeover switches becoming operative upon receipt of a predetermined binary code from said binary counter.

27. An apparatus according to claim 26, including means for successively switching said impedances in ascending or descending order;

means for readjusting said variable impedance to restore it to its previous value; and means for adjusting said variable impedance in the sense of the preceding readjusting step applied to said variable impedance.

28. An apparatus according to claim 22, wherein said binary counter includes means for alternately adjusting the variable impedance of each of said arms by a single step.

29. An apparatus according to claim 22, wherein said binary counter includes means for stepwise adjusting said variable impedances of said arms as long as said detection and decision circuit detects a decrease in said unbalance as a result of the preceding step.

* * * * *